(12) United States Patent
Cui et al.

(10) Patent No.: US 11,341,441 B2
(45) Date of Patent: May 24, 2022

(54) AUTOMATIC PRODUCT DISPATCHING DEVICE AND METHOD IN CASE OF SITE ABNORMALITY IN QUEUE TIME SECTION LOOP

(71) Applicant: Shanghai Huali Integrated Circuit Corporation, Shanghai (CN)

(72) Inventors: Xiaolin Cui, Shanghai (CN); Qiuchen Xu, Shanghai (CN); Jing Zhou, Shanghai (CN); Sainan Zhang, Shanghai (CN); Xiaoping Zheng, Shanghai (CN); Ran Huang, Shanghai (CN)

(73) Assignee: Shanghai Huali Integrated Circuit Corporation, Shanghai (CN)

( * ) Notice: Subject to any disclaimer, the term of this patent is extended or adjusted under 35 U.S.C. 154(b) by 0 days.

(21) Appl. No.: 17/142,470

(22) Filed: Jan. 6, 2021

(65) Prior Publication Data

US 2021/0350301 A1 Nov. 11, 2021

(30) Foreign Application Priority Data

May 11, 2020 (CN) .......................... 202010392298.0

(51) Int. Cl.
*G06Q 10/06* (2012.01)
*G06Q 50/04* (2012.01)
*G07C 11/00* (2006.01)

(52) U.S. Cl.
CPC ... *G06Q 10/06313* (2013.01); *G06Q 10/0635* (2013.01); *G06Q 50/04* (2013.01); *G07C 11/00* (2013.01); *G07C 2011/04* (2013.01)

(58) Field of Classification Search
None
See application file for complete search history.

(56) References Cited

U.S. PATENT DOCUMENTS 7,047,093 B2 * 5/2006 Nakamoto ......... G05B 23/0272
  700/109
7,463,939 B1 * 12/2008 Mata ..................... G06Q 10/10
  700/103

(Continued)

FOREIGN PATENT DOCUMENTS

CN 1595607 A * 3/2005 ......... G05B 19/4184

OTHER PUBLICATIONS

Yoon et al. "The Optimal Decision Combination in Semiconductor Manufacturing" (2017) (retrieved from https://www.google.com/url?esrc=s&q=&rct=j&sa=U&url=https://www.mdpi.com/2071-1050/9/10/1788/pdf&ved=2ahU KEwi83e3Vyf32AhUFZjUKHbowCasQFnoECAUQAg&usg= AOvVaw1prtAQUyi8zHMIDOLetofe) (Year: 2017).*

*Primary Examiner* — Sujay Koneru
(74) *Attorney, Agent, or Firm* — Banner & Witcoff, Ltd.

(57) ABSTRACT

The application discloses an automatic product dispatching device in case of a site abnormality in a queue time section loop, which includes a risk level definition module and a risk control logic module for product dispatching in case of the site abnormality; the risk level definition module divides risks into a plurality of levels, defines a corresponding site risk level at each site, divides a queue time section loop from a current site to an abnormal site of products into a current queue time section, a middle queue time section and an abnormal queue time section, and respectively defines section risk level; the risk control logic module forms a current product dispatching result according to a logic relationship among the section risk levels. The application further discloses an automatic product dispatching method in case of a site abnormality in a queue time section loop.

18 Claims, 1 Drawing Sheet

(56) References Cited

U.S. PATENT DOCUMENTS

| | | | | |
|---|---|---|---|---|
| 9,577,972 B1* | 2/2017 | Word | .................... | H04L 51/26 |
| 10,685,310 B1* | 6/2020 | McCuiston | ........ | G06Q 10/0635 |
| 2003/0013213 A1* | 1/2003 | Takano | .................. | G03F 7/708 |
| | | | | 438/14 |
| 2004/0113164 A1* | 6/2004 | Corbet | ...................... | H01S 5/22 |
| | | | | 372/45.01 |
| 2005/0234578 A1* | 10/2005 | Liu | ................. | G05B 19/41865 |
| | | | | 700/100 |
| 2006/0116784 A1* | 6/2006 | Chiu | ............... | G05B 19/41875 |
| | | | | 700/121 |
| 2008/0109096 A1* | 5/2008 | Jann | .................. | G05B 19/4188 |
| | | | | 700/96 |
| 2008/0140514 A1* | 6/2008 | Stenger | ................. | G06Q 10/06 |
| | | | | 705/36 R |
| 2009/0005896 A1* | 1/2009 | Gifford | ........... | G05B 19/41865 |
| | | | | 700/121 |
| 2011/0285839 A1* | 11/2011 | Kotaki | ................... | H01J 37/28 |
| | | | | 348/80 |
| 2012/0083917 A1* | 4/2012 | Zhou | ............... | G05B 19/41875 |
| | | | | 700/110 |
| 2012/0254710 A1* | 10/2012 | Flanagan | ........... | G06Q 10/0631 |
| | | | | 715/202 |
| 2013/0080293 A1* | 3/2013 | Khin | ..................... | G06Q 30/06 |
| | | | | 705/26.81 |
| 2014/0198975 A1* | 7/2014 | Nakagaki | ........... | G01N 21/9501 |
| | | | | 382/149 |
| 2014/0200953 A1* | 7/2014 | Mun | ..................... | G06Q 10/04 |
| | | | | 705/7.28 |
| 2014/0337086 A1* | 11/2014 | Asenjo | ................ | H04L 41/0896 |
| | | | | 705/7.28 |
| 2015/0212517 A1* | 7/2015 | Huang | ............ | G05B 19/41865 |
| | | | | 700/112 |
| 2016/0300338 A1* | 10/2016 | Zafar | ...................... | G06T 7/001 |
| 2017/0061538 A1* | 3/2017 | Ridgley | ................ | G06Q 40/04 |
| 2018/0075379 A1* | 3/2018 | Menezes | ........... | G06Q 10/0635 |
| 2019/0079503 A1* | 3/2019 | Unterguggenberger | ..................... | |
| | | | | G05B 13/0265 |
| 2019/0235483 A1* | 8/2019 | Oktem | ............... | G05B 23/0248 |
| 2020/0065726 A1* | 2/2020 | Gibbons | .......... | G06Q 10/06393 |
| 2020/0193340 A1* | 6/2020 | Yoon | ..................... | G06N 20/00 |
| 2020/0273339 A1* | 8/2020 | Tohriyama | ........ | B60W 30/0953 |
| 2020/0334921 A1* | 10/2020 | Spes | ..................... | G06F 17/18 |
| 2021/0276270 A1* | 9/2021 | Luan | ..................... | B29C 64/209 |

\* cited by examiner

AUTOMATIC PRODUCT DISPATCHING DEVICE AND METHOD IN CASE OF SITE ABNORMALITY IN QUEUE TIME SECTION LOOP

CROSS-REFERENCE TO RELATED APPLICATIONS

This application claims priority to Chinese Patent Application No. CN 202010392298.0 filed on May 11, 2020, and entitled "Automatic Product Dispatching Device and Method in Case of Site Abnormality in Queue Time Section Loop", the disclosure of which is incorporated herein by reference in its entirety.

TECHNICAL FIELD

The application relates to the field of semiconductor integrated circuit manufacturing, in particular to an automatic product dispatching device in case of a site abnormality in a queue time (qtime, QT) section loop. The application further relates to an automatic product dispatching method in case of a site abnormality in a queue time section loop.

BACKGROUND

In semiconductor integrated circuit manufacturing, products need to be subjected to a plurality of process steps. A Manufacture Execution System (IVIES) is usually used to control the dispatching of products between process steps.

A product process includes a queue time section loop, the queue time section loop includes a plurality of end-to-end queue time sections, each queue time section includes more than one queue time zone, and each queue time zone includes more than one site. In FIG. 1A, each site is represented by a circle indicated by a reference sign 101. In the circle 101, site 1, site 2 and site 3 are used to respectively represent sites with corresponding serial numbers.

One site corresponds to one process step in the product process, and one process step needs to be realized by more than one machine on a semiconductor production line. Products that need to be produced at each site of the product process are also called Working In Process (WIP).

After the products are completed at one site, they will enter the next site for processing.

After completing the products, some sites need to complete the subsequent corresponding processes within the queue time. Otherwise, the quality of the products will have problems, they may be discarded in serious cases, the product performance may be affected in non-serious cases, and they need to be reworked if they can be reworked. In FIG. 1A, qtime is represented by QT for short.

The queue time zone refers to a process interval corresponding to qtime. The queue time zone includes more than one site. The first site is the first site after QT starts. When the queue time zone includes one site, the first site is the ending site. When the queue time zone includes more than two sites, it further includes a plurality of sites after the first site, and the last site is the ending site. In FIG. 1A, QT1 represents the queue time after completion of site 1. The first site corresponding to QT1 is site 2, site 1 and site 2 are continuous sites, and site 2 is also the ending site, that is, the queue time zone includes one site. For example, site 1 is a photolithography process, and site 2 is an etching process. After the completion of the photolithography process at site 1, the etching process at site 2 needs to be completed within the time range defined by QT1. In this case, the queue time zone corresponds to one site. If a plurality of measurement steps such as dimension measurement and defect measurement need to be performed after the completion of the photolithography process, before the etching process corresponding to site 2, it further includes sites corresponding to the plurality of measurement steps. In this case, QT1 includes a plurality of sites.

The queue time section loop refers to that, in two adjacent queue time zones, the ending site of one queue time zone is the starting site of the other queue time zone. Referring to FIG. 1A, as the ending site of the queue time zone corresponding to QT1, site 2 is also the starting site of the queue time zone corresponding to QT2. QT2 and QT1 form a queue time section loop.

For the queue time section loop including three sites illustrated in FIG. 1A, when disconnection or stacking occurs at site 3, whether the products at site 2 need to be released to the downstream needs to be determined by simultaneously considering the two parameters QT1 and QT2. For example, if QT1 is 24 hours, QT2 is 2 hours, QT1 means that the products need to complete the process at site 2 within 24 hours after completing the process at site 1, and the time for the remaining sites is QT1 minus the time calculated from the moment that the products complete site 1. For example, if the time for completing site 1 is 7 hours, the time for the remaining sites is 17 hours. Since the time for the remaining sites is greater than QT2, site 2 may not release the products to the downstream at this time, because if the products are released at site 2, the process at site 3 must be completed within two hours corresponding to QT2; if site 3 cannot be recovered within two hours, it will inevitably have an adverse impact on the products; if the products are not released and site 3 is recovered within 19 hours, the products will not be affected. Therefore, for the queue time section loop, when a site abnormality occurs, the product dispatching between the sites needs to simultaneously consider different QT to obtain a better dispatching result.

FIG. 1A is a flowchart under a corresponding first situation in case of a site abnormality in an existing queue time section loop. It can be seen that, under the first situation, site 2 is a previous site of abnormal site 3. FIG. 1B is a flowchart under a corresponding second situation in case of a site abnormality in an existing queue time section loop. Under the second situation, the abnormal site is site 4, the starting site corresponding to QT3 is site 3, and the ending site is site 4. Since site 4 is abnormal, the dispatching of the products at site 2 needs to simultaneously consider QT1, QT2 and QT3 in the queue time section loop. Obviously, compared with FIG. 1A, the dispatching at site 2 corresponding to FIG. 1B is more complex.

In the prior art, different products or different process loops of the same products are managed by different product owners, and different owners have different definitions of qtime specification (spec), which make the dispatching results of different owners be different in case of a site abnormality in a queue time section loop. Moreover, with the increase of the length of the queue time section loop, the complexity of the existing methods in dispatching each site will also increase. In the existing methods, dispatching is in the form of imposing uniformity in all cases, i.e., releasing or not releasing, that is, dispatching is in the form of imposing uniformity in all cases by the corresponding product owners, which cannot reflect the risk level of the relevant queue time section loop and cannot achieve intelligent control.

BRIEF SUMMARY

The technical problem to be solved by the application is to provide an automatic product dispatching device in case of a site abnormality in a queue time section loop, which can perform intelligent dispatching according to the risk level of the relevant queue time section in case of the site abnormality in the queue time section loop, and thus can decrease the product quality risk. For this purpose, the application further provides an automatic product dispatching method in case of a site abnormality in a queue time section loop.

In order to solve the above technical problem, a product process module is provided in the automatic product dispatching device in case of the site abnormality in the queue time section loop provided by the application, a product process includes the queue time section loop, the queue time section loop includes a plurality of end-to-end queue time sections, each queue time section includes more than one queue time zone, and each queue time zone includes more than one site.

The automatic product dispatching device includes a risk level definition module and a risk control logic module for product dispatching in case of the site abnormality.

The risk level definition module divides risks into a plurality of levels and defines a corresponding site risk level at each site.

The risk level definition module divides the queue time section loop from a current site to an abnormal site of products into a current queue time section, a middle queue time section and an abnormal queue time section, and respectively defines a first section risk level, a second section risk level and a third section risk level.

The current queue time section is a queue time section to which the current site belongs, the abnormal queue time section is a queue time section to which the abnormal site belongs, and the middle queue time section is all the queue time sections between the current queue time section and the abnormal queue time section.

The first section risk level is the risk level of the current queue time section, the second section risk level is the risk level of the middle queue time section, and the third section risk level is the risk level of the abnormal queue time section.

The risk control logic module forms a current product dispatching result according to a logic relationship among the first section risk level, the second section risk level and the third section risk level.

As a further improvement, the first section risk level is valued as the site risk level of the current site.

In the middle queue time section, each queue time zone includes a zone risk level, the minimum site risk level in the queue time zone is valued as the zone risk level of the corresponding queue time zone, and the maximum zone risk level in the middle queue time section is valued as the second section risk level.

In the abnormal queue time section, each queue time zone includes a zone risk level, the minimum site risk level of the queue time zone is valued as the zone risk level of the corresponding queue time zone, and the minimum zone risk level in the abnormal queue time section is valued as the third section risk level.

As a further improvement, the risk levels are represented by safety factors.

As a further improvement, the risk levels are divided into four levels, the safety factor corresponding to the first level is 0, the safety factor corresponding to the second level is 1, the safety factor corresponding to the third level is 2, and the safety factor corresponding to the fourth level is 3; the risk decreases sequentially from the first level to the fourth level.

As a further improvement, the first level to the fourth level of the site risk levels are determined according to the requirement of the site on product queue time, and the risk decreases gradually from the first level to the fourth level.

A product control logic corresponding to the first level is no entry and immediate release.

A product control logic corresponding to the second level is no entry and conditional release.

A product control logic corresponding to the third level is conditional entry and conditional release.

A product control logic corresponding to the fourth level is direct entry and no release.

As a further improvement, in the risk control logic module, the logic relationships among the first section risk level, the second section risk level and the third section risk level and the corresponding current product dispatching results include:

when $V_m$ or $V_e=3$, immediate release;
when $V_s=3$, $V_m<3$ and $V_e<3$, no release;
when $V_s \leq V_e$ and $V_s>0$, conditional release;
when $V_s \leq V_e$ and $V_s=0$, immediate release;
when $V_s>V_e$ and $V_e>1$, conditional release;
when $V_m \geq V_s>V_e$ and $V_e=0$ or 1, conditional release;
when $V_m<V_s>V_e$ and $V_e=0$ or 1, no release, wherein $V_s$ represents the safety factor of the first section risk level;

$V_m$ represents the safety factor of the second section risk level;

$V_e$ represents the safety factor of the third section risk level.

As a further improvement, a condition corresponding to the conditional release is that the ratio of the remaining queue time to the queue time limit of the current product is less than a set value.

As a further improvement, when the logic relationship formed by the first section risk level, the second section risk level and the third section risk level includes a plurality of logic relationships and a plurality of corresponding current product dispatching results are formed, one of the plurality of current product dispatching results is selected as a final current product dispatching result according to a priority order of no release, conditional release and immediate release.

As a further improvement, the abnormal site is a site where disconnection or stacking occurs.

In order to solve the above technical problem, the automatic product dispatching method in case of the site abnormality in the queue time section loop provided by the application is used to control a product process, the product process includes the queue time section loop, the queue time section loop includes a plurality of end-to-end queue time sections, each queue time section includes more than one queue time zone, and each queue time zone includes more than one site.

In case of the site abnormality, the automatic product dispatching method includes a risk level definition step and a risk control logic control step.

The risk level definition step includes:

dividing risks into a plurality of levels and defining a corresponding site risk level at each site;

dividing the queue time section loop from a current site to an abnormal site of products into a current queue time section, a middle queue time section and an abnormal queue time section, and respectively defining a first section risk level, a second section risk level and a third section risk level.

The current queue time section is a queue time section to which the current site belongs, the abnormal queue time section is a queue time section to which the abnormal site belongs, and the middle queue time section is all the queue time sections between the current queue time section and the abnormal queue time section.

The first section risk level is the risk level of the current queue time section, the second section risk level is the risk level of the middle queue time section, and the third section risk level is the risk level of the abnormal queue time section.

The risk control logic control step includes forming a current product dispatching result according to a logic relationship among the first section risk level, the second section risk level and the third section risk level.

As a further improvement, the first section risk level is valued as the site risk level of the current site.

In the middle queue time section, each queue time zone includes a zone risk level, the minimum site risk level in the queue time zone is valued as the zone risk level of the corresponding queue time zone, and the maximum zone risk level in the middle queue time section is valued as the second section risk level.

In the abnormal queue time section, each queue time zone includes a zone risk level, the minimum site risk level of the queue time zone is valued as the zone risk level of the corresponding queue time zone, and the minimum zone risk level in the abnormal queue time section is valued as the third section risk level.

As a further improvement, the risk levels are represented by safety factors.

As a further improvement, the risk levels are divided into four levels, the safety factor corresponding to the first level is 0, the safety factor corresponding to the second level is 1, the safety factor corresponding to the third level is 2, and the safety factor corresponding to the fourth level is 3; the risk decreases sequentially from the first level to the fourth level.

As a further improvement, the first level to the fourth level of the site risk levels are determined according to the requirement of the site on product queue time, and the risk decreases gradually from the first level to the fourth level.

A product control logic corresponding to the first level is no entry and immediate release.

A product control logic corresponding to the second level is no entry and conditional release.

A product control logic corresponding to the third level is conditional entry and conditional release.

A product control logic corresponding to the fourth level is direct entry and no release.

As a further improvement, in the risk control logic module, the logic relationships among the first section risk level, the second section risk level and the third section risk level and the corresponding current product dispatching results include:

when Vm or Ve=3, immediate release;
when Vs=3, Vm<3 and Ve<3, no release;
when Vs≤Ve and Vs>0, conditional release;
when Vs≤Ve and Vs=0, immediate release;
when Vs>Ve and Ve>1, conditional release;
when Vm≥Vs>Ve and Ve=0 or 1, conditional release;
when Vm<Vs>Ve and Ve=0 or 1, no release, wherein Vs represents the safety factor of the first section risk level;

Vm represents the safety factor of the second section risk level;

Ve represents the safety factor of the third section risk level.

As a further improvement, a condition corresponding to the conditional release is that the ratio of the remaining queue time to the queue time limit of the current product is less than a set value.

As a further improvement, when the logic relationship formed by the first section risk level, the second section risk level and the third section risk level includes a plurality of logic relationships and a plurality of corresponding current product dispatching results are formed, one of the plurality of current product dispatching results is selected as a final current product dispatching result according to a priority order of no release, conditional release and immediate release.

As a further improvement, the abnormal site is a site where disconnection or stacking occurs.

The application can divide the queue time section loop between the current site and the abnormal site into three queue time sections in case of the site abnormality in the queue time section loop, define the risk level at each site in advance through the risk level definition module, then calculate the risk level of the three queue time sections according to the risk level of each site, and finally form the current product dispatching result according to the logic relationship among the risk levels of the three queue time sections. Therefore, the application can perform intelligent dispatching according to the risk level of the relevant queue time section in case of the site abnormality in the queue time section loop, and thus can decrease the product quality risk.

BRIEF DESCRIPTION OF THE DRAWINGS

The application will be further described below in detail in combination with the specific embodiments with reference to the drawings.

DETAILED DESCRIPTION OF THE DISCLOSURE

Figure 1A:
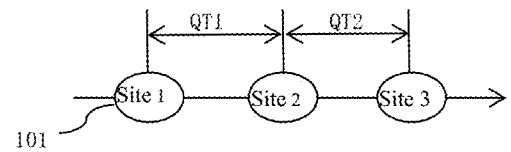
FIG. 1A is a flowchart under a corresponding first situation in case of a site abnormality in an existing queue time section loop.
Figure 1B:
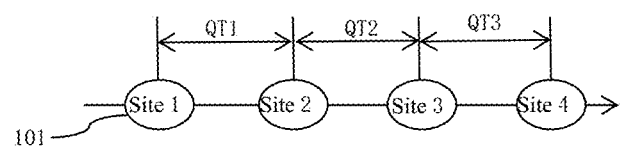
FIG. 1B is a flowchart under a corresponding second situation in case of a site abnormality in an existing queue time section loop.
Figure 2:
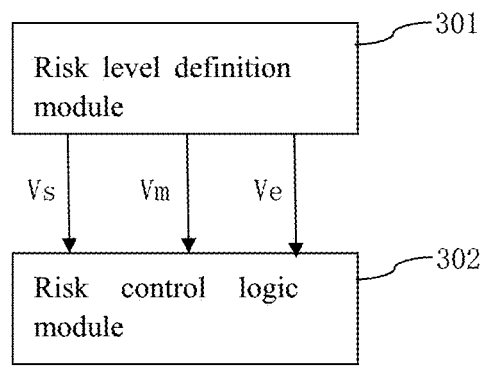
FIG. 2 is a structural diagram of an automatic product dispatching device in case of a site abnormality in a queue time section loop according to one embodiment of the application.
Figure 3:
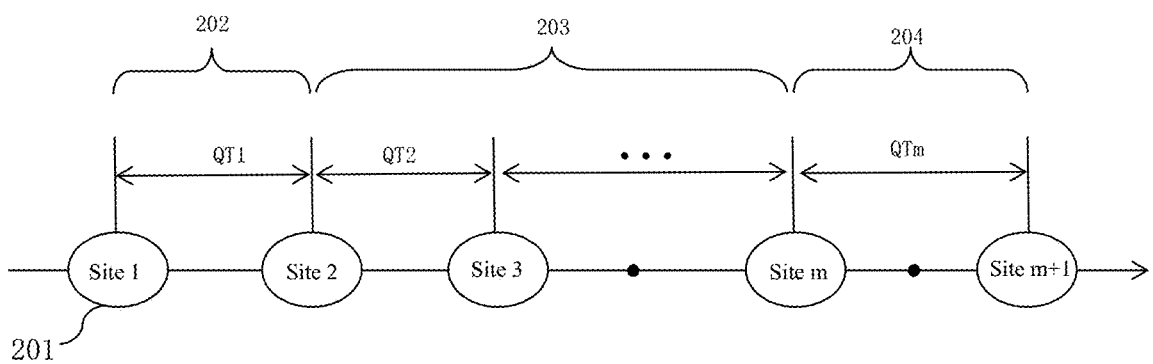
FIG. 3 is a flowchart in case of a site abnormality in a queue time section loop according to one embodiment of the application.

Referring to FIG. 2, which is a structural diagram of an automatic product dispatching device in case of a site abnormality in a queue time section loop according to one embodiment of the application; and referring to FIG. 3, which is a flowchart in case of a site abnormality in a queue time section loop according to one embodiment of the application, a product process module is provided in the automatic product dispatching device in case of the site abnormality in the queue time section loop according to one embodiment of the application, a product process includes the queue time section loop, the queue time section loop includes a plurality of end-to-end queue time sections, each queue time section includes more than one queue time zone, and each queue time zone includes more than one site.

In FIG. 2, each site is represented by a circle indicated by a reference sign 201. In the circle 201, site 1, site 2, site 3 to site m and site m+1 are respectively used to represent sites with corresponding serial numbers.

One site corresponds to one process step in the product process, and one process step needs to be realized by more than one machine on a semiconductor production line. Products that need to be produced at each site of the product process are also called WIP.

After the products are completed at one site, they will enter the next site for processing.

After completing the products, some sites need to complete the subsequent corresponding processes within the queue time, i.e., qtime. Otherwise, the quality of the products will have problems, they may be discarded in serious cases, the product performance may be affected in non-serious cases, and they need to be reworked if they can be reworked. In FIG. 3, qtime is represented by QT for short.

The queue time zone refers to a process interval corresponding to qtime. The queue time zone includes more than one site. The first site is the first site after QT starts. When the queue time zone includes one site, the first site is the ending site. When the queue time zone includes more than two sites, it further includes a plurality of sites after the first site, and the last site is the ending site. In FIG. 3, QT1 represents the queue time after completion of site 1. The first site corresponding to QT1 is site 2, site 1 and site 2 are continuous sites, and site 2 is also the ending site, that is, the queue time zone includes one site. For example, site 1 is a photolithography process, and site 2 is an etching process. After the completion of the photolithography process at site 1, the etching process at site 2 needs to be completed within the time range defined by QT1. In this case, the queue time zone corresponds to one site. If a plurality of measurement steps such as dimension measurement and defect measurement need to be performed after the completion of the photolithography process, before the etching process corresponding to site 2, it further includes sites corresponding to the plurality of measurement steps. In this case, QT1 includes a plurality of sites.

The queue time section loop refers to that, in two adjacent queue time zones, the ending site of one queue time zone is the starting site of the other queue time zone. Referring to FIG. 3, as the ending site of the queue time zone corresponding to QT1, site 2 is also the starting site of the queue time zone corresponding to QT2. QT2 and QT1 form a queue time section loop. FIG. 3 illustrates the queue time section loop consisting of the queue time zones corresponding to the queue time QT1, QT2 and QTm. In FIG. 3, each queue time zone corresponds to one site, thus there are m sites in total, and the last site corresponds to the site marked as site m+1 in the circle. In other embodiments, when the queue time zone includes more than three sites, the m queue time zones include more than m sites.

The automatic product dispatching device includes a risk level definition module 301 and a risk control logic module 302 for product dispatching in case of the site abnormality.

The risk level definition module 301 divides risks into a plurality of levels and defines a corresponding site risk level at each site.

In the embodiment of the application, the risk levels are represented by safety factors (safety values).

The risk levels are divided into four levels, the safety factor corresponding to the first level is 0, the safety factor corresponding to the second level is 1, the safety factor corresponding to the third level is 2, and the safety factor corresponding to the fourth level is 3; the risk decreases sequentially from the first level to the fourth level.

The first level to the fourth level of the site risk levels are determined according to the requirement of the site on product queue time, and the risk decreases gradually from the first level to the fourth level.

A product control logic corresponding to the first level is no entry and immediate release.

A product control logic corresponding to the second level is no entry and conditional release.

A product control logic corresponding to the third level is conditional entry and conditional release.

A product control logic corresponding to the fourth level is direct entry and no release.

The first level, the second level, the third level and the fourth level in the embodiment of the application respectively correspond to inevitable dead product, high risk, medium risk and low risk.

The first level is inevitable dead product: "no entry, direct release", that is, the corresponding product control logic is no entry and immediate release. It is required to operate strictly according to the setting of the product queue time. No matter what the downstream situation is, the products can be released normally when reaching the site. The safety factor is 0.

The second level is high risk: "no entry, conditional release", that is, the corresponding product control logic is no entry and conditional release. It is a middle level and the queue time should not be exceeded as much as possible. If the current site where the products are located is at this level, the products are released after the remaining queue time reaches a certain condition. If the downstream disconnected site is at this level, the products do not enter the downstream queue time section. The safety factor is 1.

The third level is medium risk: "conditional entry and conditional release", that is, the corresponding product control logic is conditional entry and conditional release. The queue time is exceeded slightly and the impact is very small. If the current site where the products are located is at this level, the products are released after the remaining queue time reaches a certain condition. If the downstream disconnected site is at this level, the products are released after the remaining queue time reaches a certain condition. The safety factor is 2.

The fourth level is low risk: "direct entry, no release", that is, the corresponding product control logic is direct entry and no release. It corresponds to a re-processable queue time section. If the downstream disconnected site is at this level, the products are released directly. If the downstream is not at this level but the current site where the products are located is at this level, the products are not released. The safety factor is 3.

The risk level definition module 301 divides the queue time section loop from a current site to an abnormal site of products into a current queue time section 202, a middle queue time section 203 and an abnormal queue time section 204, and respectively defines a first section risk level, a second section risk level and a third section risk level.

The abnormal site is a site where disconnection or stacking occurs. In general, when machine equipment that completes the site has a problem such as breakdown, disconnection or stacking will occur.

The current queue time section 202 is a queue time section to which the current site belongs, the abnormal queue time section 204 is a queue time section to which the abnormal site belongs, and the middle queue time section 203 is all the queue time sections between the current queue time section 202 and the abnormal queue time section 204.

The first section risk level is the risk level of the current queue time section 202, the second section risk level is the risk level of the middle queue time section 203, and the third section risk level is the risk level of the abnormal queue time section 204.

In the embodiment of the application, the first section risk level is valued as the site risk level of the current site. For example, in FIG. 3, the current site corresponds to the site marked as site 2 in the circle. When site 2 is not started, as the ending site of QT1, the current queue time section 202 only consists of the queue time zone corresponding to QT1. The value of the first section risk level is represented by Vs, and the valuing formula of Vs is as follow:

$$Vs = \text{Current Step(safety value)};$$

Current Step represents the current site and safety value represents the safety factor.

In FIG. 3, the middle queue time section 203 consists of queue time zones between site 2 and site m. In the middle queue time section 203, each queue time zone includes a zone risk level, the minimum site risk level in the queue time zone is valued as the zone risk level of the corresponding queue time zone, and the maximum zone risk level in the middle queue time section 203 is valued as the second section risk level. The value of the second section risk level is represented by Vm, and the valuing formula of Vm is as follow:

$$Vm = \max\{\min(\text{safety value}_i)\}_j$$

i represents the serial number of each site in the queue time zone corresponding to one QT, and when there are two sites in the queue time zone, i is sequentially 1 and 2; j represents the serial number corresponding to each QT in the middle queue time section 203. Referring to FIG. 3, j corresponding to the queue time zone corresponding to QT2 in the middle queue time section 203 is 2, and j will sequentially increase.

safety value$_i$ represents the safety factor of a site with serial number i in one queue time zone.

min (safety value$_i$) represents that the safety factor, i.e., the zone risk level of one queue time zone is valued as the minimum site safety factor.

max{min (safety value$_i$)}$_j$ represents that the safety factor of the queue time zone with the maximum safety factor is taken as Vm.

In the abnormal queue time section 204, each queue time zone includes a zone risk level, the minimum site risk level of the queue time zone is valued as the zone risk level of the corresponding queue time zone, and the minimum zone risk level in the abnormal queue time section 204 is valued as the third section risk level. The value of the third section risk level is represented by Ve, and the valuing formula of Ve is as follow:

$$Ve = \min\{\min(\text{safety value}_i)\}$$

i represents the serial number of each site in the queue time zone corresponding to one QT, and when there are two sites in the queue time zone, i is sequentially 1 and 2; j represents the serial number corresponding to each QT in the abnormal queue time section 204. Referring to FIG. 3, the abnormal queue time section 204 consists of the queue time zone corresponding to QTm, and j is only valued as 1.

safety value$_i$ represents the safety factor of a site with serial number i in one queue time zone.

min (safety value$_i$) represents that the safety factor of one queue time zone is valued as the minimum site safety factor.

min{min (safety value$_i$)}$_j$ represents that the safety factor of the queue time zone with the minimum safety factor is taken as Ve.

The risk control logic module 302 forms a current product dispatching result according to a logic relationship among the first section risk level, the second section risk level and the third section risk level.

In the risk control logic module 302, the logic relationships among the first section risk level, the second section risk level and the third section risk level and the corresponding current product dispatching results include:

when Vm or Ve=3, immediate release;
when Vs=3, Vm<3 and Ve<3, no release;
when Vs≤Ve and Vs>0, conditional release;
when Vs≤Ve and Vs=0, immediate release;
when Vs>Ve and Ve>1, conditional release;
when Vm≥Vs>Ve and Ve=0 or 1, conditional release;
when Vm<Vs>Ve and Ve=0 or 1, no release, wherein Vs represents the safety factor of the first section risk level;

Vm represents the safety factor of the second section risk level;

Ve represents the safety factor of the third section risk level.

In the embodiment of the application, a condition corresponding to the conditional release is that the ratio of the remaining queue time to the queue time limit of the current product is less than a set value.

When the logic relationship formed by the first section risk level, the second section risk level and the third section risk level includes a plurality of logic relationships and a plurality of corresponding current product dispatching results are formed, one of the plurality of current product dispatching results is selected as a final current product dispatching result according to a priority order of no release, conditional release and immediate release. For example, in the above logic relationships, when the two logic relationships "Vs=3, Vm<3 and Ve<3" and "Vs>Ve and Ve>1" are met at the same time, there will be two results, including no release and conditional release. In this case, no release with a higher priority should be selected as the final current product dispatching result according to the priority order of no release, conditional release and immediate release.

The embodiment of the application can divide the queue time section loop between the current site and the abnormal site into three queue time sections in case of the site abnormality in the queue time section loop, define the risk level at each site in advance through the risk level definition module 301, then calculate he risk level of the three queue time sections according to the risk level of each site, and finally form the current product dispatching result according to the logic relationship among the risk levels of the three queue time sections. Therefore, the embodiment of the application can perform intelligent dispatching according to the risk level of the relevant queue time section in case of the site abnormality in the queue time section loop, and thus can decrease the product quality risk.

The embodiment of the application further provides an automatic product dispatching method in case of a site abnormality in a queue time section loop.

The automatic product dispatching method in case of the site abnormality in the queue time section loop provided by the embodiment of the application is used to control a product process, the product process includes the queue time section loop, the queue time section loop includes a plurality of end-to-end queue time sections, each queue time section includes more than one queue time zone, and each queue time zone includes more than one site.

In FIG. 2, each site is represented by a circle indicated by a reference sign 201. In the circle 201, site 1, site 2, site 3 to site m and site m+1 are respectively used to represent sites with corresponding serial numbers.

In case of the site abnormality, the automatic product dispatching method includes a risk level definition step and a risk control logic control step.

The risk level definition step includes the following steps:

Risks are divided into a plurality of levels and a corresponding site risk level is defined at each site.

In the method provided by the embodiment of the application, the risk levels are represented by safety factors.

The risk levels are divided into four levels, the safety factor corresponding to the first level is 0, the safety factor corresponding to the second level is 1, the safety factor corresponding to the third level is 2, and the safety factor corresponding to the fourth level is 3; the risk decreases sequentially from the first level to the fourth level.

The first level to the fourth level of the site risk levels are determined according to the requirement of the site on product queue time, and the risk decreases gradually from the first level to the fourth level.

A product control logic corresponding to the first level is no entry and immediate release.

A product control logic corresponding to the second level is no entry and conditional release.

A product control logic corresponding to the third level is conditional entry and conditional release.

A product control logic corresponding to the fourth level is direct entry and no release.

The first level, the second level, the third level and the fourth level in the method provided by the embodiment of the application respectively correspond to inevitable dead product, high risk, medium risk and low risk.

The first level is inevitable dead product: "no entry, direct release", that is, the corresponding product control logic is no entry and immediate release. It is required to operate strictly according to the setting of the product queue time. No matter what the downstream situation is, the products can be released normally when reaching the site. The safety factor is 0.

The second level is high risk: "no entry, conditional release", that is, the corresponding product control logic is no entry and conditional release. It is a middle level and the queue time should not be exceeded as much as possible. If the current site where the products are located is at this level, the products are released after the remaining queue time reaches a certain condition. If the downstream disconnected site is at this level, the products do not enter the downstream queue time section. The safety factor is 1.

The third level is medium risk: "conditional entry and conditional release", that is, the corresponding product control logic is conditional entry and conditional release. The queue time is exceeded slightly and the impact is very small. If the current site where the products are located is at this level, the products are released after the remaining queue time reaches a certain condition. If the downstream disconnected site is at this level, the products are released after the remaining queue time reaches a certain condition. The safety factor is 2.

The fourth level is low risk: "direct entry, no release", that is, the corresponding product control logic is direct entry and no release. It corresponds to a re-processable queue time section. If the downstream disconnected site is at this level, the products are released directly. If the downstream is not at this level but the current site where the products are located is at this level, the products are not released. The safety factor is 3.

The queue time section loop from a current site to an abnormal site of products is divided into a current queue time section 202, a middle queue time section 203 and an abnormal queue time section 204, and a first section risk level, a second section risk level and a third section risk level are respectively defined.

The abnormal site is a site where disconnection or stacking occurs. In general, when machine equipment that completes the site has a problem such as breakdown, disconnection or stacking will occur.

The current queue time section 202 is a queue time section to which the current site belongs, the abnormal queue time section 204 is a queue time section to which the abnormal site belongs, and the middle queue time section 203 is all the queue time sections between the current queue time section 202 and the abnormal queue time section 204.

The first section risk level is the risk level of the current queue time section 202, the second section risk level is the risk level of the middle queue time section 203, and the third section risk level is the risk level of the abnormal queue time section 204.

In the method provided by the embodiment of the application, the first section risk level is valued as the site risk level of the current site. For example, in FIG. 3, the current site corresponds to the site marked as site 2 in the circle. When site 2 is not started, as the ending site of QT1, the current queue time section 202 only consists of the queue time zone corresponding to QT1. The value of the first section risk level is represented by Vs, and the valuing formula of Vs is as follow:

$$Vs = \text{Current Step(safety value)};$$

Current Step represents the current site and safety value represents the safety factor.

In FIG. 3, the middle queue time section 203 consists of queue time zones between site 2 and site m. In the middle queue time section 203, each queue time zone includes a zone risk level, the minimum site risk level in the queue time zone is valued as the zone risk level of the corresponding queue time zone, and the maximum zone risk level in the middle queue time section 203 is valued as the second section risk level. The value of the second section risk level is represented by Vm, and the valuing formula of Vm is as follow:

$$Vm = \max\{\min(\text{safety value}_i)\}_j$$

i represents the serial number of each site in the queue time zone corresponding to one QT, and when there are two sites in the queue time zone, i is sequentially 1 and 2; j represents the serial number corresponding to each QT in the middle queue time section 203. Referring to FIG. 3, j corresponding to the queue time zone corresponding to QT2 in the middle queue time section 203 is 2, and j will sequentially increase.

safety value$_i$ represents the safety factor of a site with serial number i in one queue time zone.

min (safety value$_i$) represents that the safety factor, i.e., the zone risk level of one queue time zone is valued as the minimum site safety factor.

max{min (safety value$_i$)}$_j$ represents that the safety factor of the queue time zone with the maximum safety factor is taken as Vm.

In the abnormal queue time section 204, each queue time zone includes a zone risk level, the minimum site risk level of the queue time zone is valued as the zone risk level of the corresponding queue time zone, and the minimum zone risk level in the abnormal queue time section 204 is valued as the third section risk level. The value of the third section risk level is represented by Ve, and the valuing formula of Ve is as follow:

$$Ve = \min\{\min(\text{safety value}_i)\}$$

i represents the serial number of each site in the queue time zone corresponding to one QT, and when there are two sites in the queue time zone, i is sequentially 1 and 2; j represents the serial number corresponding to each QT in the abnormal queue time section 204. Referring to FIG. 3, the abnormal queue time section 204 consists of the queue time zone corresponding to QTm, and j is only valued as 1.

safety value$_i$ represents the safety factor of a site with serial number i in one queue time zone.

min (safety value$_i$) represents that the safety factor of one queue time zone is valued as the minimum site safety factor.

min{min (safety value$_i$)}$_j$ represents that the safety factor of the queue time zone with the minimum safety factor is taken as Ve.

The risk control logic control step includes forming a current product dispatching result according to a logic relationship among the first section risk level, the second section risk level and the third section risk level.

In the risk control logic module 302, the logic relationships among the first section risk level, the second section risk level and the third section risk level and the corresponding current product dispatching results include:

when Vm or Ve=3, immediate release;
when Vs=3, Vm<3 and Ve<3, no release;
when Vs≤Ve and Vs>0, conditional release;
when Vs≤Ve and Vs=0, immediate release;
when Vs>Ve and Ve>1, conditional release;
when Vm≥Vs>Ve and Ve=0 or 1, conditional release;
when Vm<Vs>Ve and Ve=0 or 1, no release, wherein Vs represents the safety factor of the first section risk level;

Vm represents the safety factor of the second section risk level;

Ve represents the safety factor of the third section risk level.

In the method provided by the embodiment of the application, a condition corresponding to the conditional release is that the ratio of the remaining queue time to the queue time limit of the current product is less than a set value.

When the logic relationship formed by the first section risk level, the second section risk level and the third section risk level includes a plurality of logic relationships and a plurality of corresponding current product dispatching results are formed, one of the plurality of current product dispatching results is selected as a final current product dispatching result according to a priority order of no release, conditional release and immediate release. For example, in the above logic relationships, when the two logic relationships "Vs=3, Vm<3 and Ve<3" and "Vs>Ve and Ve>1" are met at the same time, there will be two results, including no release and conditional release. In this case, no release with a higher priority should be selected as the final current product dispatching result according to the priority order of no release, conditional release and immediate release.

The application has been described above in detail through the specific embodiments, which, however, do not form limitations to the application. Without departing from the principle of the application, those skilled in the art may also make many variations and improvements, which should also be regarded as included in the protection scope of the application.

What is claimed is:

1. An automatic product dispatching device in case of a site abnormality in a queue time section loop, wherein
   a product process module is provided in the automatic product dispatching device, a product process comprises the queue time section loop, the queue time section loop comprises a plurality of end-to-end queue time sections, each queue time section comprises more than one queue time zone, and each queue time zone comprises more than one site;
   one site is a process step in product process flow, the process step is a step for manufacturing products in semiconductor integrated circuit manufacturing, one process step is realized by more than one machine on a semiconductor integrated circuit manufacturing production line;
   the products produced at each site are working in progress, after completing all the process steps of the product process flow, a semiconductor integrated circuit will be formed on the product;
   in each queue time zone, after completing a starting site, the products need to complete an ending site within a queue time, otherwise a quality of the products will have problems;
   the automatic product dispatching device comprises a risk level definition module and a risk control logic module for product dispatching in case of the site abnormality;
   the risk level definition module divides risks into a plurality of levels and defines a corresponding site risk level at each site;
   the risk level of the site is determined according to a requirement of the site on product queue time;
   the risk level definition module divides the queue time section loop from a current site to an abnormal site of products into a current queue time section, a middle queue time section, and an abnormal queue time section, and respectively defines a first section risk level, a second section risk level, and a third section risk level;
   the current queue time section is a queue time section to which the current site belongs, the abnormal queue time section is a queue time section to which the abnormal site belongs, and the middle queue time section is all of the queue time sections between the current queue time section and the abnormal queue time section;
   the first section risk level is the risk level of the current queue time section, the second section risk level is the risk level of the middle queue time section, and the third section risk level is the risk level of the abnormal queue time section;
   the risk control logic module forms a current product dispatching result according to a logic relationship among the first section risk level, the second section risk level, and the third section risk level; and
   the current product dispatching result include: no release, immediate release, and conditional release, no release means that the current product does not enter the next site, immediate release means that the current product immediately enters the next site, and conditional release means that the current product enters the next site when conditions are met.

2. The automatic product dispatching device in case of the site abnormality in the queue time section loop according to claim 1, wherein the first section risk level is valued as the site risk level of the current site;
in the middle queue time section, each queue time zone comprises a zone risk level, the minimum site risk level in the queue time zone is valued as the zone risk level of a corresponding queue time zone, and the maximum zone risk level in the middle queue time section is valued as the second section risk level; and
in the abnormal queue time section, each queue time zone comprises a zone risk level, the minimum site risk level of the queue time zone is valued as the zone risk level of the corresponding queue time zone, and the minimum zone risk level in the abnormal queue time section is valued as the third section risk level.

3. The automatic product dispatching device in case of the site abnormality in the queue time section loop according to claim 2, wherein the risk levels are represented by safety factors.

4. The automatic product dispatching device in case of the site abnormality in the queue time section loop according to claim 3, wherein the risk levels are divided into four levels, the safety factor corresponding to a first level is 0, the safety factor corresponding to a second level is 1, the safety factor corresponding to a third level is 2, and the safety factor corresponding to a fourth level is 3, wherein the risk decreases sequentially from the first level to the fourth level.

5. The automatic product dispatching device in case of the site abnormality in the queue time section loop according to claim 4, wherein the first level to the fourth level of the site risk levels are determined according to the requirement of the site on product queue time, and the risk decreases gradually from the first level to the fourth level;
a product control logic corresponding to the first level is no entry and immediate release;
a product control logic corresponding to the second level is no entry and conditional release;
a product control logic corresponding to the third level is conditional entry and conditional release; and
a product control logic corresponding to the fourth level is direct entry and no release.

6. The automatic product dispatching device in case of the site abnormality in the queue time section loop according to claim 5, wherein in the risk control logic module, the logic relationships among the first section risk level, the second section risk level, and the third section risk level and corresponding current product dispatching results comprise:
when $Vm$ or $Ve=3$, immediate release;
when $Vs=3$, $Vm<3$ and $Ve<3$, no release;
when $Vs \leq Ve$ and $Vs>0$, conditional release;
when $Vs \leq Ve$ and $Vs=0$, immediate release;
when $Vs>Ve$ and $Ve>1$, conditional release;
when $Vm \geq Vs>Ve$ and $Ve=0$ or 1, conditional release; and
when $Vm<Vs>Ve$ and $Ve=0$ or 1, no release,
wherein $Vs$ represents the safety factor of the first section risk level,
$Vm$ represents the safety factor of the second section risk level, and
$Ve$ represents the safety factor of the third section risk level.

7. The automatic product dispatching device in case of the site abnormality in the queue time section loop according to claim 6, wherein a condition corresponding to the conditional release is that a ratio of a remaining queue time to a queue time limit of the current product is less than a set value.

8. The automatic product dispatching device in case of the site abnormality in the queue time section loop according to claim 7, wherein when the logic relationship formed by the first section risk level, the second section risk level, and the third section risk level comprises a plurality of logic relationships and a plurality of corresponding current product dispatching results are formed, one of the plurality of current product dispatching results is selected as a final current product dispatching result according to a priority order of no release, conditional release, and immediate release.

9. The automatic product dispatching device in case of the site abnormality in the queue time section loop according to claim 1, wherein the abnormal site is a site where disconnection or stacking occurs.

10. An automatic product dispatching method in case of a site abnormality in a queue time section loop, wherein
the automatic product dispatching method is used to control a product process, the product process comprises the queue time section loop, the queue time section loop comprises a plurality of end-to-end queue time sections, each queue time section comprises more than one queue time zone, and each queue time zone comprises more than one site;
one site is a process step in product process flow, the process step is a step for manufacturing products in semiconductor integrated circuit manufacturing, one process step is realized by more than one machine on a semiconductor integrated circuit manufacturing production line;
the products produced at each site are working in progress, after completing all the process steps of the product process flow, a semiconductor integrated circuit will be formed on the product;
in each queue time zone after completing a starting site, the products need to complete an ending site within a queue time, otherwise a quality of the products will have problems;
in case of the site abnormality, the automatic product dispatching method comprises a risk level definition step and a risk control logic control step;
the risk level definition step comprises:
dividing risks into a plurality of levels and defining a corresponding site risk level at each site;
the risk level of the site is determined according to a requirement of the site on product queue time;
dividing the queue time section loop from a current site to an abnormal site of products into a current queue time section, a middle queue time section, and an abnormal queue time section, and respectively defining a first section risk level, a second section risk level, and a third section risk level;
the current queue time section is a queue time section to which the current site belongs, the abnormal queue time section is a queue time section to which the abnormal site belongs, and the middle queue time section is all of the queue time sections between the current queue time section and the abnormal queue time section;
the first section risk level is the risk level of the current queue time section, the second section risk level is the risk level of the middle queue time section, and the third section risk level is the risk level of the abnormal queue time section;
the risk control logic control step comprises forming a current product dispatching result according to a logic relationship among the first section risk level, the second section risk level, and the third section risk level; and the current product dispatching result include: no release, immediate release, and conditional release, no release means that the current product does not enter the next site, immediate release means that the current product immediately enters the next site, and conditional release means that the current product enters the next site when conditions are met.

11. The automatic product dispatching method in case of the site abnormality in the queue time section loop according to claim 10, wherein the first section risk level is valued as the site risk level of the current site;

in the middle queue time section, each queue time zone comprises a zone risk level, the minimum site risk level in the queue time zone is valued as the zone risk level of a corresponding queue time zone, and the maximum zone risk level in the middle queue time section is valued as the second section risk level; and in the abnormal queue time section, each queue time zone comprises a zone risk level, the minimum site risk level of the queue time zone is valued as the zone risk level of the corresponding queue time zone, and the minimum zone risk level in the abnormal queue time section is valued as the third section risk level.

12. The automatic product dispatching method in case of the site abnormality in the queue time section loop according to claim 11, wherein the risk levels are represented by safety factors.

13. The automatic product dispatching method in case of the site abnormality in the queue time section loop according to claim 12, wherein the risk levels are divided into four levels, the safety factor corresponding to a first level is 0, the safety factor corresponding to a second level is 1, the safety factor corresponding to a third level is 2, and the safety factor corresponding to a fourth level is 3.

14. The automatic product dispatching method in case of the site abnormality in the queue time section loop according to claim 13, wherein the first level to the fourth level of the site risk levels are determined according to the requirement of the site on product queue time, and the risk decreases gradually from the first level to the fourth level;

a product control logic corresponding to the first level is no entry and immediate release;

a product control logic corresponding to the second level is no entry and conditional release;

a product control logic corresponding to the third level is conditional entry and conditional release; and a product control logic corresponding to the fourth level is direct entry and no release.

15. The automatic product dispatching method in case of the site abnormality in the queue time section loop according to claim 14, wherein in the risk control logic control step, the logic relationships among the first section risk level, the second section risk level, and the third section risk level and corresponding current product dispatching results comprise:

when $V_m$ or $V_e=3$, immediate release;
when $V_s=3$, $V_m<3$ and $V_e<3$, no release;
when $V_s \leq V_e$ and $V_s>0$, conditional release;
when $V_s \leq V_e$ and $V_s=0$, immediate release;
when $V_s>V_e$ and $V_e>1$, conditional release;
when $V_m \geq V_s>V_e$ and $V_e=0$ or 1, conditional release; and
when $V_m<V_s>V_e$ and $V_e=0$ or 1, no release, wherein $V_s$ represents the safety factor of the first section risk level, $V_m$ represents the safety factor of the second section risk level, and $V_e$ represents the safety factor of the third section risk level.

16. The automatic product dispatching method in case of the site abnormality in the queue time section loop according to claim 15, wherein a condition corresponding to the conditional release is that a ratio of a remaining queue time to a queue time limit of the current product is less than a set value.

17. The automatic product dispatching method in case of the site abnormality in the queue time section loop according to claim 16, wherein when the logic relationship formed by the first section risk level, the second section risk level, and the third section risk level comprises a plurality of logic relationships and a plurality of corresponding current product dispatching results are formed, one of the plurality of current product dispatching results is selected as a final current product dispatching result according to a priority order of no release, conditional release and immediate release.

18. The automatic product dispatching method in case of the site abnormality in the queue time section loop according to claim 10, wherein the abnormal site is a site where disconnection or stacking occurs.

* * * * *